US006968392B1

(12) United States Patent
Wilford et al.

(10) Patent No.: US 6,968,392 B1
(45) Date of Patent: Nov. 22, 2005

(54) METHOD AND APPARATUS PROVIDING IMPROVED STATISTICS COLLECTION FOR HIGH BANDWIDTH INTERFACES SUPPORTING MULTIPLE CONNECTIONS (75) Inventors: Bruce Wilford, Los Altos, CA (US); Jan Medved, Pleasanton, CA (US); Stephan Crandall, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 621 days.

(21) Appl. No.: 09/607,584

(22) Filed: Jun. 29, 2000

(51) Int. Cl.[7] .......................................... G06F 15/173
(52) U.S. Cl. ..................................... 709/240; 370/229
(58) Field of Search ............................. 709/221–225, 709/240; 370/229–240

(56) References Cited

U.S. PATENT DOCUMENTS

| 4,556,972 | A | * | 12/1985 | Chan et al. ................. 370/354 |
| 4,964,155 | A | * | 10/1990 | Pinard ........................ 379/136 |
| 5,193,165 | A | * | 3/1993 | Eikill et al. ................. 711/106 |
| 5,379,295 | A | * | 1/1995 | Yonehara .................... 370/400 |
| 5,390,231 | A | * | 2/1995 | Hung et al. ................... 379/2 |
| 5,402,416 | A | * | 3/1995 | Cieslak et al. ............... 370/236 |
| 5,438,567 | A | * | 8/1995 | Ikeda .......................... 370/417 |
| 5,455,825 | A | * | 10/1995 | Lauer et al. ................. 370/413 |
| 5,491,395 | A | * | 2/1996 | Hutsell et al. ............... 318/560 |
| 5,519,689 | A | * | 5/1996 | Kim ........................... 370/232 |
| 5,530,848 | A | * | 6/1996 | Gilbert et al. ............... 709/313 |
| 5,726,977 | A | * | 3/1998 | Lee ............................ 370/235 |
| 5,732,087 | A | * | 3/1998 | Lauer et al. ................. 370/416 |
| 5,768,123 | A | * | 6/1998 | Maxemchuk ................ 700/28 |
| 5,802,287 | A | * | 9/1998 | Rostoker et al. ........... 370/395.5 |
| 5,878,063 | A | * | 3/1999 | Kawasaki et al. .......... 714/818 |
| 5,943,479 | A | * | 8/1999 | Klein et al. ................. 709/212 |
| 5,959,991 | A | * | 9/1999 | Hatono et al. ............. 370/235.1 |
| 6,097,698 | A | * | 8/2000 | Yang et al. .................. 370/231 |
| 6,141,326 | A | * | 10/2000 | Minami ....................... 370/244 |
| 6,185,185 | B1 | * | 2/2001 | Bass et al. ................... 370/230 |
| 6,243,378 | B1 | * | 6/2001 | Olnowich .................... 370/388 |
| 6,256,660 | B1 | * | 7/2001 | Govindaraju et al. ....... 709/200 |
| 6,256,674 | B1 | * | 7/2001 | Manning et al. ............. 709/232 |
| 6,282,200 | B1 | * | 8/2001 | Ikeda ......................... 370/397 |
| 6,304,900 | B1 | * | 10/2001 | Cromer et al. .............. 709/221 |
| RE37,435 | E | * | 11/2001 | Yoshimura et al. ......... 370/236 |
| 6,320,351 | B1 | * | 11/2001 | Ng et al. ..................... 320/104 |
| 6,335,918 | B1 | * | 1/2002 | Mourier ...................... 370/241 |
| 6,430,181 | B1 | * | 8/2002 | Tuckey ....................... 370/386 |
| 6,430,191 | B1 | * | 8/2002 | Klausmeier et al. ........ 370/412 |
| 6,467,008 | B1 | * | 10/2002 | Gentry et al. ............... 710/261 |
| 6,473,400 | B1 | * | 10/2002 | Manning .................... 370/229 |
| 6,490,640 | B1 | * | 12/2002 | Johansson ................... 710/52 |
| 6,493,315 | B1 | * | 12/2002 | Simpson et al. ............ 370/229 |

(Continued)

Primary Examiner—Bunjob Jaroenchonwanit
(74) Attorney, Agent, or Firm—Blakely, Sokoloff, Taylor & Zafman LLP (57) ABSTRACT

An apparatus and method that provides improved statistics collection for high bandwidth interfaces supporting multiple connections. Statistics are counted for a plurality of connections. A determination is made to determine if a count value for each of the connections is greater than or equal to a threshold. Statistics are collected for connections having a determined count value greater than or equal to the threshold before connections having a count value below the threshold. The apparatus and method can thus avoid data loss and reduce wasted processing time in maintaining reliable and accurate statistics for multiple connection supported by a network switch or interface.

25 Claims, 4 Drawing Sheets

U.S. PATENT DOCUMENTS

| | | | |
|---|---|---|---|
| 6,493,780 B2 * | 12/2002 | Hsu | 710/260 |
| 6,505,281 B1 * | 1/2003 | Sherry | 711/168 |
| 6,526,059 B1 * | 2/2003 | Yamazaki | 370/395.1 |
| 6,526,060 B1 * | 2/2003 | Hughes et al. | 370/395.4 |
| 6,539,432 B1 * | 3/2003 | Taguchi et al. | 709/227 |
| 6,567,839 B1 * | 5/2003 | Borkenhagen et al. | 709/103 |
| 6,587,471 B1 * | 7/2003 | Bass et al. | 370/432 |
| 6,650,694 B1 * | 11/2003 | Brown et al. | 375/150 |
| 6,721,273 B1 * | 4/2004 | Lyon | 370/235 |
| 6,754,206 B1 * | 6/2004 | Nattkemper et al. | 370/369 |
| 6,810,031 B1 * | 10/2004 | Hegde et al. | 370/351 |

* cited by examiner

METHOD AND APPARATUS PROVIDING IMPROVED STATISTICS COLLECTION FOR HIGH BANDWIDTH INTERFACES SUPPORTING MULTIPLE CONNECTIONS

FIELD OF THE INVENTION

The present invention relates generally to digital communications. More particularly, the present invention relates to network switches and interfaces. Specifically, the present invention relates to a method and apparatus providing improved statistics collection for high bandwidth interfaces supporting multiple connections.

BACKGROUND OF THE INVENTION

A common type of network device is a network switch. A network switch forwards traffic or data units (e.g., cells or packets) from a source network component or components to a destination network component or components. Typically, network switch includes interfaces such as, for example, line cards, which are used to process network traffic and to pass selectively the traffic in and out of the switch. A line card is capable of supporting multiple high bandwidth channels or connections on bi-directional ports.

A common operation performed by a line card is accumulating and collecting statistics about a connection. Accumulating and collecting statistics about a connection has many useful applications. For example, if a connection is for a telephone call, determining the amount or types of cells or packets passing via the connection during a specific time period is important for billing purposes.

Thus, as traffic passes through a line card, statistics are counted and collected. Current line cards count statistics for each connection using counters. For example, a traffic cell passing through a line card may increment a traffic cell counter for a connection by one and the incremented count is stored in a memory.

Consequently, as line card speeds and number of connections per line cards increase, a limitation with current network interfaces is that a larger number of statistics have to be collected in shorter periods of time. A common method of collecting statistics for connections is polling for stored counted statistics in set time intervals for each connection regardless of the amount or type of traffic passing in each connection.

A disadvantage with the above polling method is data loss. That is, if a connection having high traffic must wait a certain time period before being polled, a counter for the high traffic connection may roll over thus providing unreliable and inaccurate statistical information. Furthermore, polling statistical information for a connection having a small amount or no traffic wastes processing time.

Therefore, avoiding data loss and reducing wasted processing time is critical in maintaining reliable and accurate statistical information for multiple connections supported by a network switch or interface.

SUMMARY OF THE INVENTION

A method and apparatus are disclosed that provide improved statistics collection for high bandwidth interfaces supporting multiple connections. Statistics are counted for a plurality of connections. A determination is made to determine if a count value for each of the connections is greater than or equal to a threshold. Statistics are collected for connections having a determined count value greater than or equal to threshold before connections having a count value below the threshold.

Other features and advantages of the present invention will be apparent from the accompanying drawings, and from the detailed description, which follows below.

BRIEF DESCRIPTION OF THE DRAWINGS

The present invention is illustrated by way of example and not limited by the figures of the accompanying drawings in which like references indicate similar elements and in which.

DETAILED DESCRIPTION

A method and apparatus are described that provide improved statistics collection for high bandwidth interfaces supporting multiple connections. Statistics are counted for a plurality of connections. A determination is made to determine if a count value for each of the connections is greater than or equal to a threshold. Statistics are collected for connections having a determined count value greater than or equal to the threshold before connections having a count value below the threshold.

By collecting statistics for connections having respective count values greater than or equal to a threshold before collecting statistics for connections having respective count values below the threshold, loss of statistical information for high traffic connections can be avoided. That is, statistical information for high traffic connections is collected before a counter associated with a respective high traffic connection rolls over. Furthermore, processing load is reduced and used efficiently by collecting statistics at a rate necessary for low traffic connections.

The apparatus and method described herein can thus avoid data loss and reduce wasted processing time in maintaining reliable and accurate statistics for multiple connection supported by a network switch or interface.

In the following embodiments, a network switch and interface are presented in the context of collecting statistical information for traffic cells. For example, the network interface may be a line card supporting multiple connections, which communicate traffic cells for an asynchronous transfer mode (ATM) switch. Nevertheless, other types of data units for varying types of network switches may be used such as, for example, data frames, blocks or packets.

Furthermore, in the following embodiments, statistical information is referred to as "stats." In addition, statistical information collection is referred to as "stats collection."

Figure 1:
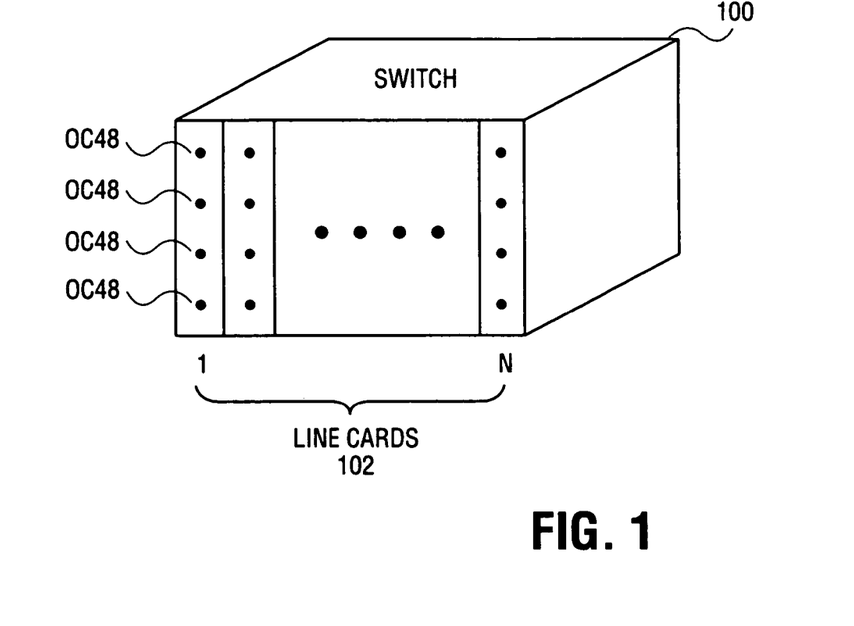
FIG. 1 is an illustration of an exemplary network switch for practicing the invention.

FIG. 1 is an illustration of an exemplary network 100 switch for practicing the invention. Alternatively, other types of network devices such as, for example, a network router, may be used for practicing the invention.

Referring to FIG. 1, network switch 100 includes a plurality of line cards 102 (1 through N), which may support a plurality of connections on multiple ports. Network switch 100 is a network device that forwards selectively traffic cells on connections supported by line cards 102. Network switch 100 may support a number of protocols. For example, network switch 100 may be an asynchronous transfer mode (ATM) switch supporting multiple virtual connections ("VCs"). Alternatively, network switch 100 may be an Ethernet or Internet switch.

Line cards 102 are interfaces for network switch 100 that receive and forward traffic cells to and from network switch 100. Line cards 102 may be inserted or removed from the network switch 100. Line cards 102 may also support a number of different types of network ports. For example, line cards 102 may support optical carrier (OC) bi-directional network ports. Alternatively, line cards 102 may support other types of ports such as, for example, synchronous transport system (STS) ports or synchronous digital hierarchy (SDH) ports.

Furthermore, each line card may have any number of network ports operating at different speeds and supporting a plurality of connections. In the example of FIG. 1, each line card is shown to be a 10 Gigabit/s line card having four 2.5 Gigabit/s optical carrier OC48 bi-directional network ports. The four (OC48) network ports may support up to one million connections.

Figure 2:
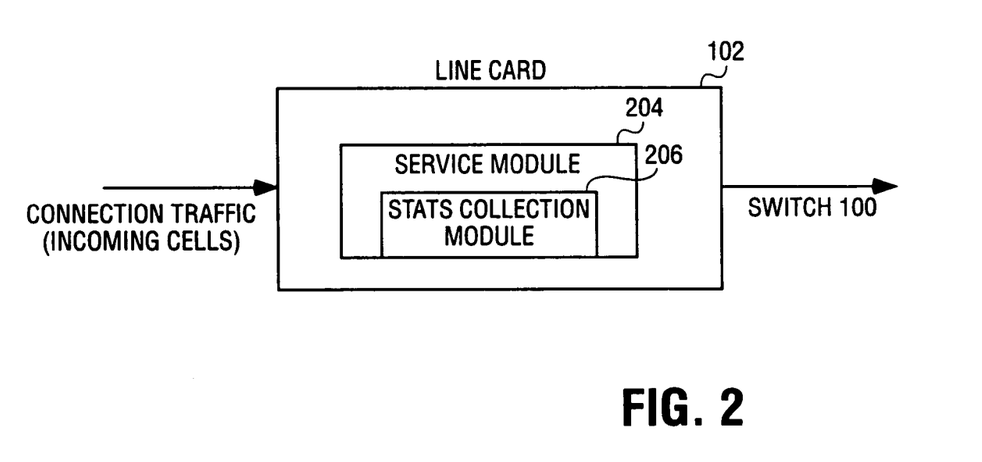
FIG. 2 is an internal functional block diagram of a line card according to one embodiment.

FIG. 2 is an internal functional block diagram of a line card for line cards 102 according to one embodiment. For purposes of explanation, the line card of FIG. 2 is referred to as line card 102. Line card 102 may represent any of the line cards 1 through N. For purposes of clarity, line card 102 is shown as uni-directional, however, line card 102 may be bi-directional. Furthermore, basic internal circuitry and components of line card 102 are not described in detail as not to obscure invention.

Referring to FIG. 2, line card 102 includes a service module 204 having a statistical ("stats") collection module 206. Service module 204 may be hardware or software or a combination of both that processes connection traffic of incoming cells ("cells") for network switch 100. Service module 204 operates to set up connections for network switch 100. For example, as cells are being received by line card 102, service module 204 determines which network ports on which line cards to forward the cells to. Service module 204 processes a header field in the cells to determine which network ports to forward the cells to. Service module 204 forwards the cells to network switch 100 such that the cells are switched to desired network ports on desired line cards.

Stats collection module 206 may also be hardware or software or a combination of both that processes cells to accumulate and collect statistical information for connections based on the amount or type of cells being communicated via the connections. For example, Table 1 shown below lists exemplary types of statistical information that may be accumulated and collected by stats collection module 206 for line card 102.

TABLE 1

(Exemplary Statistical Information)

Number of Cells per Virtual Connection (VC)
Number of Cells with the Cell Loss Priority Bit set to 0 (CLP0)
Number of Cells with the Cell Loss Priority Bit set to 1 (CLP1)

TABLE 1-continued (Exemplary Statistical Information)

Number of CLP1 cells dropped
Number of Operation and Management (OAM) cells

The exemplary statistical information shown in Table 1 may be accumulated and collected for each connection supported by line card 102. Stats collection module 206 may include a plurality of adders wherein each adder is associated with a connection. Furthermore, an adder may be associated for each stat of each connection. For example, an adder may correspond to a connection to count the number of cells that are being communicated via the connection. The adder is then incremented for each cell passing through line card 102 for that connection. Thus, adders in stats collection module 206 are continuously counting stats for each received cell.

Exemplary Stats Collection Architecture

Figure 3:
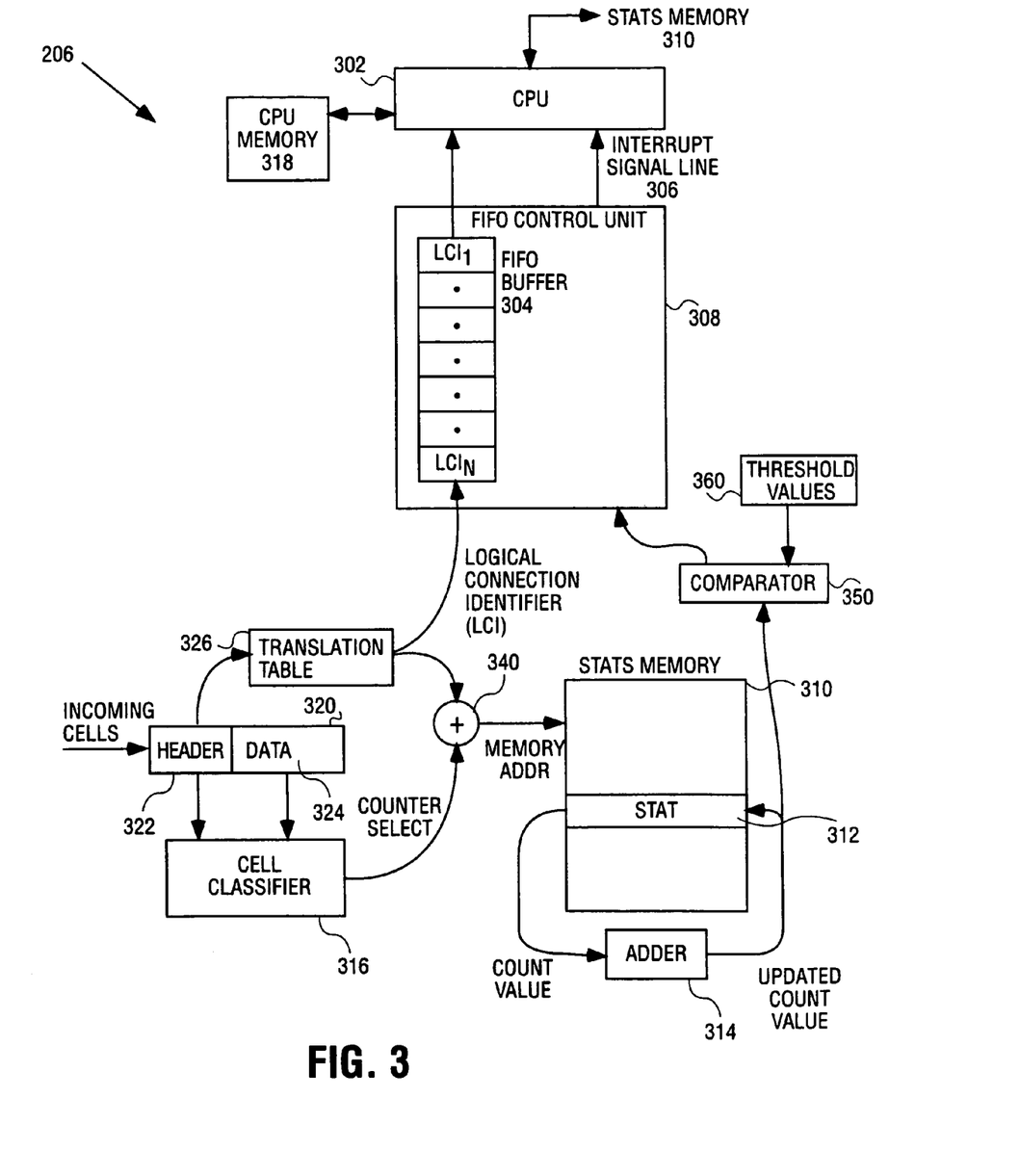
FIG. 3 is an illustration of an exemplary stats collection architecture.

FIG. 3 is an illustration of an exemplary stats collection architecture 206 for the stats collection module of line card 102. The exemplary stats collection architecture 206 illustrates the internal components and operations of line card 102, which provide improved statistics collection for network interfaces supporting multiple connections.

For purposes of explanation, the following description of exemplary stats collection architecture 206 refers to a single adder for a single stat. However, exemplary stats collection architecture 206 may include a plurality of adders counting stats for a plurality of traffic types and connections.

Referring to FIG. 3, the exemplary stats collection architecture 206 includes a translation table 326 and cell classifier 316, which process incoming cells 320, memory address generator 340 generating memory addresses, stats memory 310 storing stats for connections, adder 314 counting stats based on addresses from address generator 340, comparator 350 comparing count values with threshold values, memory 360 storing threshold values, first-in-first-out (FIFO) control unit 308 generating interrupt signals and controlling a FIFO buffer 304 storing logical connection identifiers (LCIs), central processing unit (CPU) 302 collecting stats, and CPU memory 318 storing collected stats.

The interconnections for exemplary stats collection architecture 206 will now be described in detail. Translation table 326 and cell classifier 316 are coupled with memory address generator 340, which is coupled to stats memory 310. Translation table 326 is also coupled with FIFO control unit 308 via FIFO buffer 304. Adder 314 is coupled with stats memory 310 and comparator 350. Comparator 350 is coupled with memory 360 that stores threshold values and FIFO control unit 308. FIFO control unit 308 is also coupled with CPU 302 via interrupt signal line 306 and FIFO buffer 304. CPU 302 is also coupled with stats memory 310 (interconnection not shown for clarity) and CPU memory 318.

The exemplary stats collection architecture 206 functions will now be described in detail. Translation table 326 is a processing unit that processes a header field 322 for each cell of incoming cells 320. Cell 320 includes a header field 322 and data field 324. Translation table 326 may be a physical device or a software module providing instructions for a processing device. Although one cell 320 is depicted for incoming cells, the cell 320 may represent a stream of incoming cells. Header field 322 includes information such as, for example, cell or connection type information (i.e., VCI/VPI), destination information, or switching information. Data field 324 includes information that is to be forwarded.

Cell classifier 316 is a processing unit that may process both header field 322 and data field 324 of cell 320. Cell classifier 316 may be a physical device or a software module providing instructions for a processing device. Cell classifier 316 operates to classify the "type of cell" for cell 320 based on the header field 322 or data field 324 or both. Cell classifier 316 sends the "type of cell" information to memory address generator 340. For example, if cell 320 is an OAM cell, cell classifier 316 classifies cell 320 as an OAM cell and informs memory address generator 340 that cell 320 is an OAM cell.

Translation table 326 operates to process the header field 322 of cell 320 and to translate the information in the header field 322 into a logical connection identifier. The logical connection identifier (LCI) is an internal representation to identify a specific connection and to a specific stream of cells for line card 102. CPU 302 can determine where in stats memory 310 to collect a specific stat for a specific "cell type" of a specific connection (LCI). That is, if cell 320 has an LCI and "cell type" corresponding to stat 312, then CPU 302 can collect all stats for a connection associated with that cell. Translation table 326 sends the LCI information to memory address generator 340. Translation table 326 may also send LCI information to FIFO buffer 304 (if instructed by FIFO control unit 308).

Memory address generator 340 is a processing unit that processes LCI information from translation table 326 and "type of cell" information from cell classifier 316. That is, memory address generator 340 can associate a memory address for every LCI and "type of cell" information for an incoming cell. Memory address generator 340 may be a physical device or a software module providing instructions for a processing device. Memory address generator 340 operates to generate an address of a location in stats memory 310, which is used by adder 314 to count a stat 312 stored at the address. For example, if adder 314 is designated to count a stat 312 at a specific memory address for cell 320, memory address generator 340 will generate an address at location 312 in stats memory 310 for adder 314, which will use that address to increment a count stored in stat 312.

Stats memory 310 is a memory device, which operates to store a plurality of statistical information for each connection. For example, stats memory 310 may store statistical information as described in Table 1 above. The statistical information may be accumulated or updated as each cell is being received by the line card 102. That is, as each cell is received, an adder corresponding to the stat for the cell is incremented by one. Furthermore, although a single stat memory is shown, the exemplary stats collection architecture 206 may utilize any number of memories for storing stats.

Adder 314 is a counting device. For one embodiment, adder 314 is a 32-bit counter. Adder 314 operates to increment by one a stat stored at the address generated by memory address generator 340. For purposes of clarity, one adder 314 is shown. However, exemplary stats collection architecture 206 may have a plurality of adders such that an adder is associated with each "type of cell" information and LCI. In the example of FIG. 3, adder 314 is associated with the LCI information and "type of cell" information related to stat 312 stored in stats memory 310. Stat 312 stores statistical information related to cell 320.

Adder 314 increments a count value represented by stat 312. To increment or accumulate stat 312, stat 312 is retrieved using the address from address generator 340 and inputted into adder 314. Adder 314 then increments the count value for stat 312 by one and stores the incremented count value as stat 312 back in the same location retrieved from in stats memory 310. For example, if stat 312 stores the total number of OAM cells for connection 1 (LCI 1) and cell 320 is an OAM cell for connection 1 (LCI 1), memory address generator 340 will generate an address for the location of stat 312 stored in stats memory 310. Assuming stat 312 stores a count value of "100," adder 314 will increment the count value of "100" by one to generate an incremented count value of "101," which is stored as stat 312 in stats memory 310 at the same location.

Figure 4A:
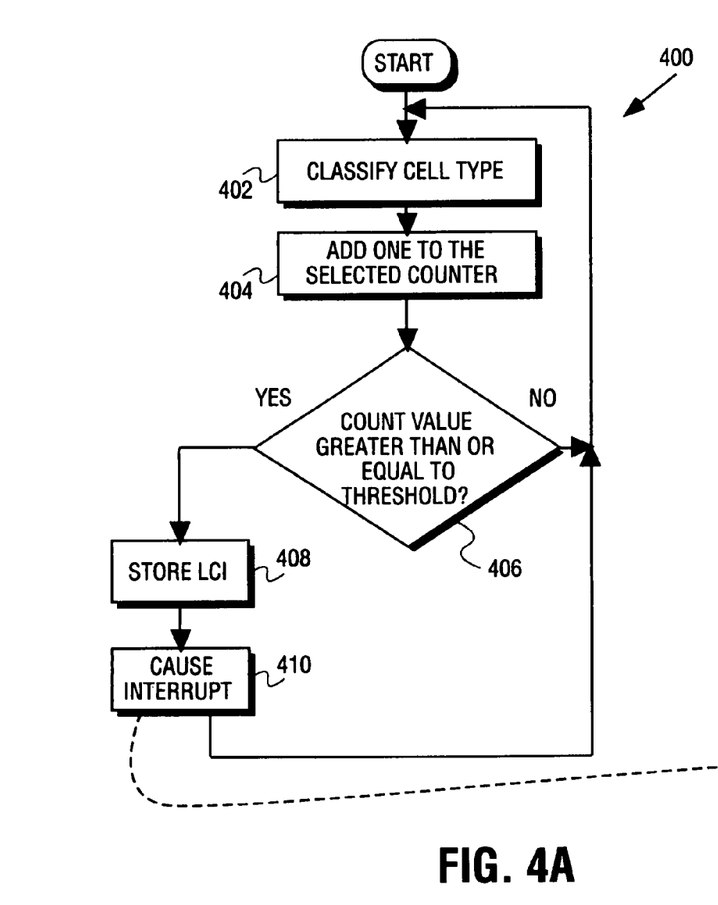
FIG. 4A is a flow chart illustrating an exemplary high priority interrupt operation.

The count value of adder 314 is also inputted to comparator 350. Comparator 350 is a device that operates to compare count values in adder 314 with programmable threshold values stored in memory 360. For purposes of clarity, one comparator 350 is shown. However, exemplary stats collection architecture 206 may have a plurality of comparators such that a comparator is associated with each adder. Comparator 350 compares count values for adder 314 with threshold values stored in memory 360. For example, comparator 350 can determine whether a count value for adder 314 is greater than or equal to a specific threshold value stored in memory 360. Comparator 350 operates to exemplary stats collection architecture 206 of FIG. 3. For purposes of explanation, operation 400 refers to a single adder 314, single stat 312, and a single comparator 350. Operation 400, however, may apply to a plurality of adders, stats, and comparators operating concurrently. Also, for purposes of explanation, operation 400 begins at operation 402.

At operation 402, cell classifier 316 classifies a "type of cell" for cell 320 and translation table 326 selects an LCI for cell 320. The LCI and "type of cell" are combined into a memory address by memory address generator 340. The memory address determines which stat 312 is to be counted in stats memory 310. That is, cell 320 relates to stat 312 for which adder 314 increments a count value for stat 312.

At operation 404, adder 314 increments the count value for stat 312 by one for cell 320. Adder 314 then stores the incremented count value back in stats 312 at the same location in stats memory 310. For example, if stat 312 stored total number of cells, adder 314 will then add one to the total number of cells and store the incremented count value at the same location of stat 312. The count value for adder 314 is also input to comparator 350, which determines if the count value for adder 314 is greater than or equal to a threshold.

At operation 406, comparator 350 compares the count value of adder 314 with a programmable threshold value stored in memory 360 to determine if the count value for adder 312 is greater than or equal to the threshold.

For example, adder 314 may be a 32-bit adder and may have a threshold value that is 50% of a maximum count value for 32-bit adder. Thus, a 32-bit adder, will count to 50% its maximum count value when its count value is greater than 0x80000000.

Comparator 350 can be configured or programmed to determine if adder 314 has reached or is above of a count value of 0x80000000. For example, comparator 350 can also determine if adder 314 is above its half way mark based on the upper bits of adder 314. Consequently, if stat 312 is counting at 27 million counts/s, stat 312 will reach 0x80000000 in 80 seconds. If the stat 312 is not polled or collected within 160 seconds (in approximately 3 minutes), stat 312 will roll over and the count value for stat 312 will become unreliable and inaccurate.

As shown in Table 2 below, exemplary polling schemes and half count times (time an adder will reach 50% a maximum count for a 32-bit adder) for varying types of connections are illustrated.

TABLE 2

(Exemplary Polling Schemes)

| Active Conns. | Average Cell Rate | Half Count Time | Average Polling Frequency |
|---|---|---|---|
| 1 | 27000000 | 80 seconds | 80 seconds/1 Conn = 80s |
| 50 | 540000 | 66 minutes | 66 mins/50 Conns = 80s |
| 1000 | 27000 | 22 hours | 22 hrs/1000 Conns = 80s |
| 8000 | 3375 | 7.3 days | 7.3 days/8000 Conns = 80s |
| 256k | 103 | 7.9 months | 7.9 mins/256k Conns = 80s |

As can be seen from Table 2 above, to avoid losing reliable statistical information, statistical information for high traffic connections must be collected before collecting statistical information for low traffic connections. That is, if a connection, which is communicating high bandwidth traffic, is to be polled, e.g., at every 5 minutes, the polled information may be unreliable as a result of a stat rolling over in approximately 3 minutes. As such, a reliable way to poll or collect stats for a high bandwidth connection is to poll or collect all stats if any of its corresponding stats are greater than or equal to a threshold to ensure that its stats are collected before any of its counters roll over.

At operation 408, to collect a stat 312 that is greater than or equal to a threshold, FIFO control unit 308 stores its LCI in FIFO buffer 304.

Furthermore, FIFO buffer 304 may provide a plurality of entries such that a plurality of adders may reach a threshold thus causing a plurality of LCIs to be stored therein. FIFO control unit 308 may also prevent duplicate LCIs from being stored in FIFO buffer 304.

For one embodiment, if FIFO buffer 304 is full, FIFO control unit 308 may allow adder 314 to reach another threshold and place the LCI related to stat 312 in FIFO buffer 304. For example, if adder 314 goes from 0x80000000 to 0x80000000, FIFO control unit 308 may retry to load the LCI associated with adder 314 into FIFO buffer 304 a second time.

For an alternative embodiment, to address the situation of multiple counters reaching the threshold mark at the same time (e.g., halfway marks in inform FIFO control unit 308 if a count value of adder 314 is greater than or equal the threshold.

FIFO control unit 308 is a processing device that processes information from comparator 350. FIFO control unit 308 operates to store the LCI related to stat 312 that is above a threshold, into FIFO buffer 304. FIFO buffer 304 may store a plurality of LCIs ($LCI_1$ through $LCI_N$). Consequently, $LCI_1$ through $LCI_N$ refer to high priority stats—stats having a corresponding adder with a count value that is greater than or equal to a threshold. As such, FIFO control unit 308 operates to send an interrupt signal to CPU 302 if the count value of adder 314 is greater than or equal to the threshold. The interrupt signals informs CPU 302 that stat 312 is greater than or equal to the threshold and that consequently all stats related to that connection (LCI) should be collected before collecting stats related to LCIs having all stats below the threshold.

CPU 302 is a processing unit that polls and collects statistical information by reading ("stats") in stats memory 310 for each connection of line card 102. CPU 302 may include its own counters or adders to count the polled or collected stats from stats memory 310. For one embodiment, CPU 302 has internal counters that are wider than adder 314 for stats collection module 206. For example, the internal counters for CPU 302 may be 64 bit counters and adder 314 may be a 32-bit counter. As such, CPU 302 may maintain a larger stat count than adder 314. CPU 302 may store polled and collected stats in CPU memory 318. CPU memory 318 may be located within CPU 302 or outside of CPU 302.

For one embodiment, CPU 302 may poll each stat in stats memory 310 at regular intervals to collect the stats for each connection, but may poll stats for the connections out of order based on a received interrupt from FIFO control unit 308 via interrupt signal line 306. For example, in one implementation, CPU 302 collects stats based on adder 314 being below or greater than or equal to a threshold. That is, if CPU 302 was polling or collecting statistics for connections at regular time intervals and stat 312 is incremented by adder 314 to produce a result that is greater than or equal to a threshold, FIFO control unit 308 would send an interrupt to CPU 302. CPU 302 would then read LCI, from FIFO buffer 304 and retrieve all the stats related to $LCI_1$ from stats memory 310 before polling or collecting stats for other connections.

Thus, CPU 302 will poll stats for high traffic connections more quickly than for low traffic connections, which prevents collecting unreliable and inaccurate stats. As such, CPU 302 can poll at a rate necessary for low traffic connections.

Exemplary Operations

Figure 4B:
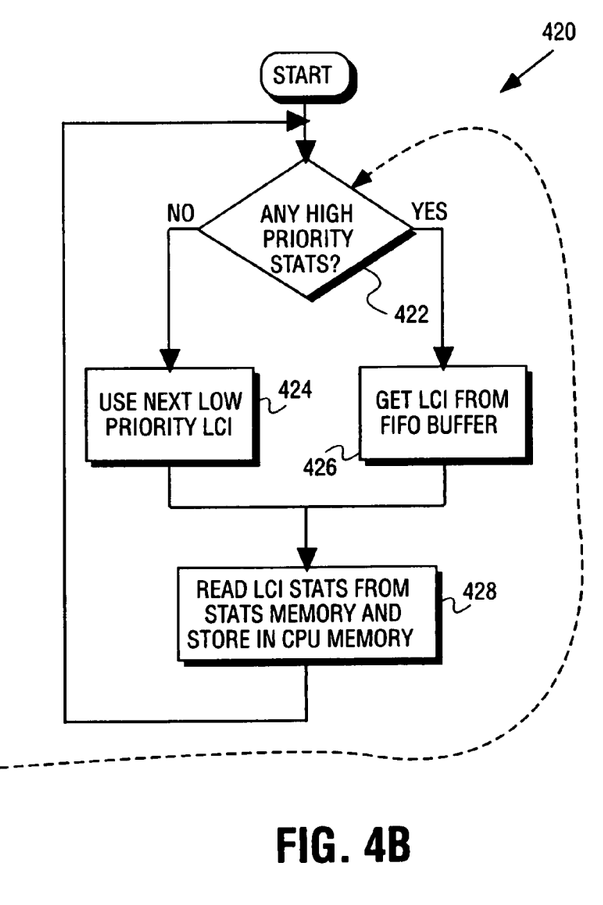
FIG. 4B is a flow chart illustrating an exemplary improved polling operation.

The exemplary operations for the exemplary stats collection architecture 206 will now be described with reference to FIGS. 4A, 4B, and 5. FIGS. 4A and 4B operate in parallel, however, for purposes of explanation, FIGS. 4A and 4B will be described separately.

FIG. 4A is a flow chart illustrating an exemplary high priority interrupt operation 400. For purposes of explanation, operation 400 refers to the which multiple counters go from 0x7FFFFFFF to 0x80000000 simultaneously), a two-tier priority scheme may be implemented where the top bit of the address indicate that the LCI associated with the adder should be stored in into FIFO buffer 304 and the next to top bit of the adder may indicate:

0—for low priority, LCI associated with the adder is put into FIFO buffer 304 if space is available.

1—for high priority, LCI put into FIFO buffer 304 if space is available, if no space is available, then low priority entries may be removed and replaced with high priority entries.

As such, stats may reach, for example, a 75% maximum count value threshold. Such a priority scheme allows these stats to be serviced ahead of stats that are between one half and three quarters of their full count.

At operation 410, FIFO control unit 308 then sends an interrupt signal on interrupt signal line 306 to CPU 302. The interrupt signal informs CPU 302 that a count value for adder 314 is greater than or equal to the threshold and the incremented stat is considered a "high priority" stat. This operation relates to operation 422 of FIG. 4B. That is, after receiving an interrupt signal, CPU 320 will then read the LCI in FIFO buffer 304 (i.e., $LCI_1$) and poll or collect the high priority stat related to $LCI_1$. Operation 400 then loops back to operation 402 and repeats the above operation.

Thus, a high priority interrupt operation for determining high priority and low priority stats has been described, which is used in polling and collecting stats.

FIG. 4B is a flow chart illustrating one embodiment of an improved polling operation 420. For purposes of explanation, operation 420 refers to the exemplary stats collection architecture 206 of FIG. 3. For purposes of explanation, operation 400 refers to a single adder 314, single stat 312, and a single comparator 350. Operation 400, however, may apply to a plurality of adders, stats, and comparators operating concurrently. Also, for purposes of explanation, operation 420 begins at operation 422.

Prior to operation 422, CPU 302 may poll each stat in stats memory 310 in regular time intervals. CPU 302, however, may poll and collect high priority stats before polling other low priority stats. Such an operation will now be described below.

Referring to FIG. 4B, at operation 422, CPU 302 determines if there are any high priority stats. CPU 302 can determine if there is a high priority stat if CPU 302 receives an interrupt signal from FIFO control unit 308. That is, high priority stats determination is dependent on operation 410 of FIG. 4A that causes an interrupt for when a count value for adder 314 is greater than or equal to a threshold count value and its associated stat is considered "high priority".

At operation 424, if CPU 302 does not determine that there is a high priority stat, CPU 302 will poll stats at regular intervals or use low priority LCIs to poll a stat in stats memory 310. A low priority LCI relates to a connection having a count value below a threshold. For example, if the threshold is 50% of a maximum count value for an adder, CPU 302 can poll stats for connections in regular time intervals having a corresponding adder, which has a count value below the threshold.

At operation 426, if there is a high priority stat (i.e., a stat related to an adder having a count value greater than or equal to a threshold), CPU 302 retrieves a LCI from FIFO buffer 304, which stores LCIs for high priority stats.

At operation 428, CPU 302 will then read or ("collect") all stats related to the retrieved LCI from FIFO buffer 304, which is related to the high priority stat. CPU 302 will then store the collected stat in CPU memory 318. For example, if stat 312 was a high priority stat that caused an interrupt its corresponding LCI to be stored in FIFO buffer 304 as $LCI_1$, CPU 302 will read $LCI_1$ and retrieve next stat 312 corresponding to $LCI_1$. Operation 420 then loops back to operation 422 and repeats the above operation.

Thus, an improved polling operation for collecting stats has been described by polling high priority stats before low priority stats.

Figure 5:
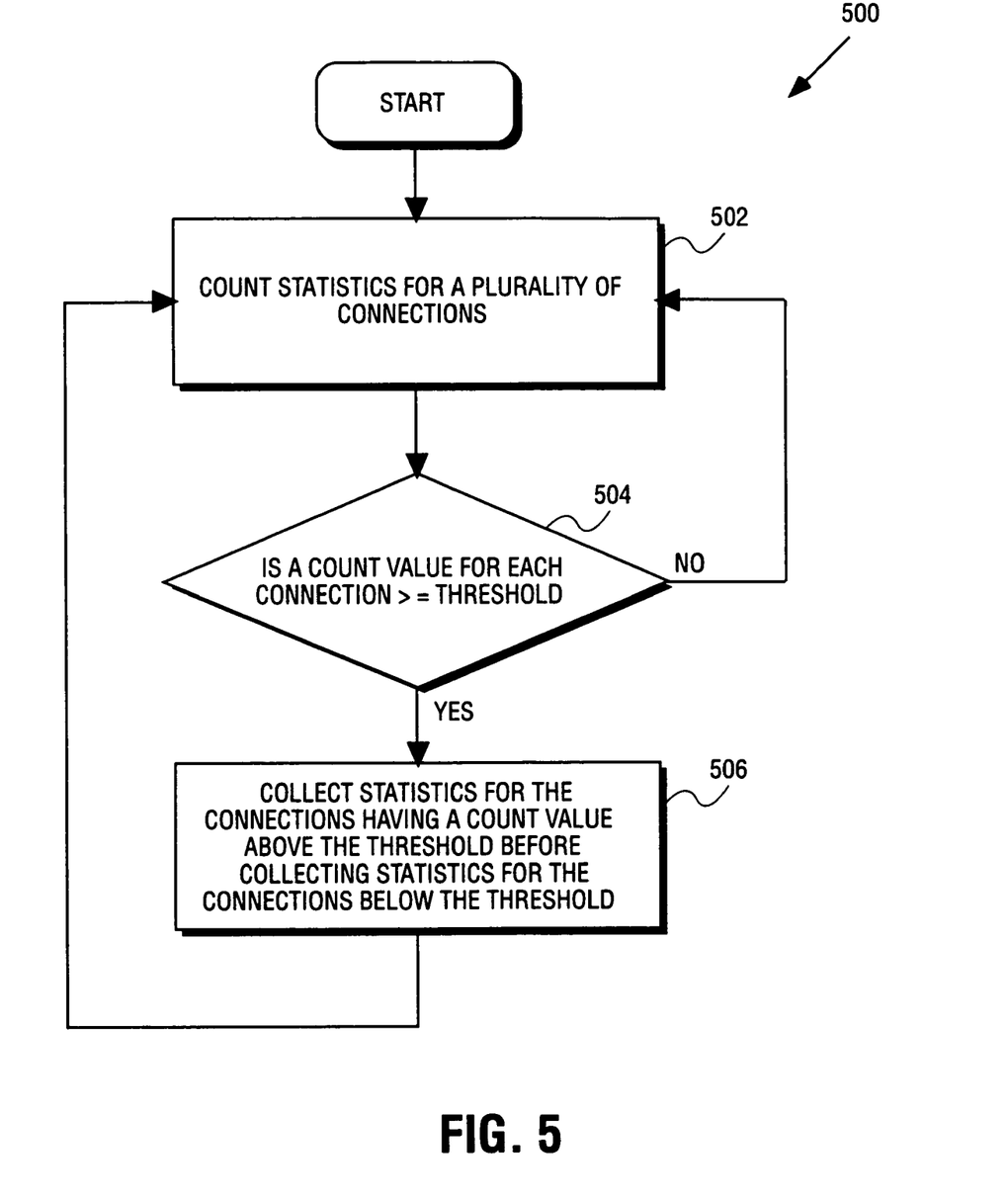
FIG. 5 is a flow chart illustrating an exemplary operation for collecting statistics.

FIG. 5 is a flow chart illustrating one embodiment of an operation 500 for collecting statistics for the exemplary stats collection architecture 206 of FIG. 3. For purposes of explanation, operation 500 begins at operation 502.

At operation 502, statistics are counted for a plurality of connections. For example, a plurality of adders (i.e., adder 314) may count simultaneously statistics for a plurality of connections.

At operation 504, a determination is made to determine if a count value for each of the connections is greater than or equal to a threshold. For example, adder 314 may be a 32-bit counter and if its count value is equal to or above 0x80000000 it will store the LCI for that stat (i.e., stat 312) associated with adder 314 in FIFO buffer 304. If no adder is equal to or above the threshold, operation 500 continues at operation 502.

At operation 506, if a counter is greater than or equal a threshold, CPU 302 will collect statistics for the connections associated with counters having a count value greater than or equal to the threshold before collecting statistics for connections having a count value below the threshold. For example, CPU 302 will be interrupted to collect stats based on the LCIs stored in FIFO buffer 304. Thus, CPU will collect statistics associated with counters before they roll over to prevent unreliable and inaccurate stats information to be stored in stats memory 310. Operation 500 then loops back to operation 502 and repeats the above operation.

Thus, an operation for collecting statistics that collects reliable and accurate stats has been described.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

We claim:

1. A method for a network switch, the method comprising:
counting statistics for a plurality of connections to generate a count value for each of the plurality of connections, wherein the statistics include a number of cells per virtual channel and a number of cells having a loss priority bit;
determining if the count value for each of the connections is above a threshold; and
collecting statistics for the connections of the switch having the count value above the threshold before connections having the count value below the threshold.

2. The method of claim 1, wherein the threshold is a percentage of a maximum count limit, wherein the percentage is calculated to ensure the statistics are collected before the maximum count limit is reached.

3. The method of claim 1, wherein determining if the count value for each of the connections is above the threshold includes:
sending an interrupt signal from a control unit to a processor for each connection having a determined count value above the threshold indicating that the statistics have a high priority.

4. The method of claim 3, wherein collecting statistics for the connections includes:
collecting statistics for connections with interrupt signals before other connections without interrupt signals.

5. The method of claim 3, wherein sending an interrupt signal includes:
placing a logical connection identifier for each statistic having an associated count value above the threshold, wherein the logical connection identifier is placed in a first-in-first-out (FIFO) buffer.

6. The method of claim 5, wherein collecting statistics for connections includes:
reading statistics in a memory based on the logical connection identifiers stored in the FIFO buffer.

7. An apparatus comprising:
one or more counters, each counter to count statistics for a connection to generate a count value, wherein the statistics include a number of cells per connection and a number of cells having a loss priority bit; and a processor to determine if the count value for each of the counters is above a threshold and to collect the statistics for the connections of a switch from counters having the count value above the threshold before counters having the count value below the threshold.

8. The apparatus of claim 7, further comprising a control unit coupled to the one or more counters and the processor, wherein the control unit is configured to send an interrupt signal to the processor for each connection having the count value above the threshold indicating that the statistics have a high priority.

9. The apparatus of claim 8, wherein the processor is to collect statistics from counters sending interrupt signals before other counters without interrupt signals.

10. The apparatus of claim 8, further comprising:
a first-in-first-out (FIFO) buffer to store logical connection identifiers, each logical connection identifier to be used to collect high priority statistics.

11. The apparatus of claim 10, further comprising:
a memory to store statistics, wherein the processor is to read high priority statistics in the memory based on the logical connection identifiers stored in the FIFO buffer.

12. A network interface comprising:
a memory to store statistics for a connection, wherein the statistics include a number of cells per connection and a number of cells having a loss priority bit;
one or more counters, each counter to count statistics stored in the memory to generate a count value;
a processor to determine if the count value for each of the counters is above a threshold and to collect the statistics for the connections of a switch stored in the memory derived from counters having the count value above the threshold before collecting statistics in the memory derived from counters having the count value below the threshold.

13. The network interface of claim 12, further comprising a control unit coupled to the one or more counters and the processor, wherein the control unit is configured to send an interrupt signal to the processor for each connection having the count value above the threshold indicating that the statistics have a high priority.

14. The network interface claim 13, wherein the processor is to collect statistics from for connections with interrupt signals before other connections without interrupt signals.

15. The network interface of claim 13, further comprising:
a first-in-first-out (FIFO) buffer to store logical connection identifiers, each logical connection identifier to be used to collect high priority statistics.

16. The network interface of claim 15, further comprising:
a memory to store statistics, wherein the processor is to read high priority statistics in the memory based on the logical connection identifiers in the FIFO buffer.

17. The network interface of claim 12, further comprising:
one or more ports, each port receiving or forwarding traffic cells.

18. The network interface of claim 17, wherein the one or more ports are optical carrier (OC) ports, synchronous transport system (STS) ports, or synchronous digital hierarchy (SDH) ports.

19. An apparatus comprising:
means for counting statistics for a plurality of connections to generate a count value for each of the plurality of connections, wherein the statistics include a number of cells per connection of the plurality of connections and a number of cells having a loss priority bit;
means for determining if the count value for each of the connections is greater than or equal to a threshold; and
means for collecting the statistics for the connections of a switch having count value greater than or equal to the threshold before connections having the count value below the threshold.

20. The apparatus of claim 19, further comprising:
means for processing information received from the means for determining; and
means for sending an interrupt signal from the means for processing information to a processor for each connection having count value greater than or equal to the threshold indicating that the statistics have a high priority.

21. The apparatus of claim 20, further comprising:
means for placing a logical connection identifier for each statistic having an associated count value above the threshold in a first-in-first-out (FIFO) buffer.

22. The apparatus of claim 21,
means for reading statistics in a memory based on the logical connection identifiers stored in the FIFO buffer.

23. A statistics collection module comprising:
a memory to store statistics for a connection, wherein the statistics include a number of cells per connection and a number of cells having a loss priority bit;
one or more module counters, each module counter to count the statistics stored in the memory;
a central processing unit (CPU) having internal CPU counters to count values from the one or more module counters, the CPU to determine if a count value for each of the module counters is greater than or equal to a threshold and to collect the statistics for the connections of a switch stored in the memory derived from the module counters with the count value that is greater than or equal to the threshold before collecting statistics in the memory derived from the module counters having the count value below the threshold.

24. The statistics collection module of claim 23, wherein the internal CPU counters are wider than the one or more module counters.

25. The statistics collection module of claim 24, wherein the internal CPU counters are 64-bit counters and the one or more module counters are 32-bit counters.

* * * * *